United States Patent [19]

Bedford et al.

[11] 4,051,072

[45] Sept. 27, 1977

[54] METHOD FOR MAKING PELLET TYPE CATALYST

[75] Inventors: Raymond E. Bedford, Burton; Morris Berg, Grand Blanc, both of Mich.

[73] Assignee: General Motors Corporation, Detroit, Mich.

[21] Appl. No.: 673,711

[22] Filed: Apr. 5, 1976

[51] Int. Cl.² .................. B01J 21/04; B01J 23/20; B01J 23/24; B01J 23/72; B01J 23/40; B01J 23/74

[52] U.S. Cl. .................. 252/464; 252/465; 252/466 J; 252/466 PT; 252/463; 423/213.2; 423/213.5

[58] Field of Search ............ 252/463, 464, 465, 466 J, 252/466 PT; 423/213.2, 213.5

[56] References Cited

U.S. PATENT DOCUMENTS

| | | | |
|---|---|---|---|
| 3,467,602 | 9/1969 | Koester | 252/463 X |
| 3,565,830 | 2/1971 | Keith et al. | 252/466 PT |
| 3,679,605 | 7/1972 | Sanford et al. | 252/463 |
| 3,856,706 | 12/1974 | Harrison et al. | 252/477 R |
| 3,928,238 | 12/1975 | Koberstein et al. | 252/463 X |
| 3,933,685 | 1/1976 | Madderra et al. | 252/463 X |
| 3,957,690 | 5/1976 | Bobolev et al. | 252/463 X |

*Primary Examiner*—W. J. Shine
*Attorney, Agent, or Firm*—Sidney Carter

[57] ABSTRACT

A method for making improved pellet type catalysts utilizing a support material having relatively high alkali metal content, comprising the steps of grinding the support material to the desired size, forming the pellet into the desired shape and size, calcining the pellet to obtain the desired surface area, soaking the calcined pellet in a dilute acid for a short period of time to form the alkali metal salt of the acid to a controlled depth inward from the surface of the pellet, and impregnating the pellet with the desired catalytically active metallic material after draining the acid wash solution, the depth of penetration of the catalytic material being limited to the depth treated by the acid wash.

10 Claims, No Drawings

METHOD FOR MAKING PELLET TYPE CATALYST

This invention relates to the method for forming the improved pellet type catalyst disclosed and claimed in co-pending United States Patent application Ser. No. 638,031 filed Feb. 13, 1976 and assigned to the assignee of the instant application. More particularly, our invention comprises the steps necessary for processing refractory ceramic materials in a controlled manner so as to produce, repeatably, an improved pellet type catalyst having a pore structure, surface area, and depth of penetration of catalytic material such as to enable the required catalyst lifetime at conversion rates meeting regulatory requirements. Our method utilizes a support material having a relatively high alkali metal content of at least about 0.15%, e.g., from about 0.15 to about 0.6% $Na_2O$ based on the weight of the support material to be used in our processing, and comprises the steps of grinding the support material to the desired size, preferably about 10 microns average size with a range such that about 90% by weight of the particles are from about 1 to 20 microns, mixing the support material with a combustible organic material such as saran microballoons in an amount of from about 0.12 to about 0.5% by weight of the pellet after forming to obtain the desired pore size characteristics upon firing of the material, forming the material into pellets of the desired shape and size, calcining the pellets at temperatures of from about 1700° F. to about 1860° F. peak to obtain the desired surface area, soaking the calcined pellets in a very dilute acid or solution of acid salts of at least about 0.04%, e.g., from about 0.04 to about 0.15 wt. % HCl, for a short period of time of at least about one minute, e.g., as from about one up to about five minutes to form the alkali metal salt of the acid with the free alkali metal in the support to a controlled depth at the surface of the pellets, and impregnating the drained pellets with the desired catalytically active metallic material, the depth of penetration being substantially limited to the depth of treatment by the acid wash.

The prior art uses support material having very low alkali metal content and goes to elaborate and costly steps of acid washing the ceramic material followed by reprecipitation and filtration in order to remove the alkali metal, i.e., $Na_2O$. For example, where alumina trihydrate is used, the material is dissolved in acid followed by reprecipitation of the alumina as an aluminum salt which then must be calcined after filtration to drive off the acid anions and form the gamma alumina. Alternatively, the $Na_2O$ can be removed by water-washing and filtration, this, too, being a time-consuming and expensive operation.

In the course of our experiments, we have found that the presence of the alkali metal not only does not impair the activity of the catalyst, but is in fact necessary to our invention from several standpoints, first — it enables treatment with a very dilute acid solution to obtain a controlled depth of penetration of catalytically active material within the surface of the pellet and secondly — it imparts to the pellet a high degree of thermal stability which is otherwise obtained by subsequent addition of alkali metal and alkaline earth salts as is taught by the U.S. Pat. No. to Smith et al., 2,454,227 dated Nov. 16, 1948. Also, where the support material is alumina with a high $Na_2O$ content as described, we have found a further advantage in that the BET specific surface area of the calcined pellet increases with increasing $Na_2O$ content and thus is effective for surface area control.

While the use of combustible organic filler materials in admixture with ceramic materials for forming a catalyst support is known in the art, as shown in the U.S. Pat. No. to Sanford et al., 3,679,605, dated July 25, 1972, we have found it necessary to maintain the concentration of such material to a very much lower level to prevent unacceptably low pellet crush resistance and pellet bulk density with loss of mechanical strength.

Also, while treatment of cermaic support material with acid solutions is known in the art, such treatment involves the use of very much more concentrated acids for purposes and by chemical action other than our neutralization for the control of the depth of penetration of the catalytically active materials. The U.S. Pat. No. to Harrison 3,856,706, dated Dec. 24, 1974 teaches the use of an acid at boiling temperature and 40–75% by weight concentration over extended periods to leach out at least a portion of the aluminum and magnesium in a cordierite monolith support structure. The U.S. Pat. No. to Becker et al 2,967,185, dated Jan. 3, 1961, embodies a similar acid treatment of pellets.

It is accordingly an object of our invention to provide a method for making improved pellet type catalyst whereby the refractory support material used is relatively inexpensive since it contains a high concentration of alkali metal.

It is another object of our invention to provide a method for making improved pellet type catalyst whereby the depth of penetration of the catalyst material into the support is controlled by a neutralization treatment of the support with very dilute acid.

It is a further object of our invention to provide a method for making an improved pellet type catalyst in a controlled, repeatable manner to provide the desired pore structure, surface area, and depth of penetration of catalytic material.

In carrying out our invention, the porous refractory support material may be selected from well known refractory ceramic materials such as alumina (including its forms in various states of hydration, i.e., $\gamma$ alumina, bayerite, gibbsite, boehmite), cordierite, mullite, silica, zirconia and mixtures of such refractory metal oxides. We prefer to use alumina trihydrate as commercially available from the Bayer Process. The pellet catalyst may be formed in various shapes such as spherical or ball, extrudate forms such as cylindrical and hollow cylinders, granules, rings and the like. The preferred forms are those of spheres formed by well known methods such as by a rotating disc, and a solid cylinder formed by extrusion.

While we will describe our invention in terms using platinum and platinum/palladium, it should be understood that other catalytically active metallic materials such as those of Groups V-B, VI-B, VI-A, and VIII of the Periodic Table may be used, e.g., nickel, iron, chromium, cobalt, ruthenium and rhodium, their oxides, copper and its oxide, and mixtures thereof, it being known that specific catalytic activity varies between materials in a given operating environment.

As noted above, the raw batch alumina used to manufacture commercial pellet type catalysts for automotive emissions catalytic converters has been processed to substantially reduce or entirely remove the alkali metal, principally $Na_2O$. Since such treatment adds substantially to the cost of the catalyst, attempts were made to use alumina with the relatively high $Na_2O$ content normally found in the Bayer Process aluminas. Impregnation of such support material with the catalytically active platinum/palladium solutions resulted in poor catalyst distribution, low catalyst penetration and poor conversion over the desired life span.

In accordance with our invention we have found that the commercial alumina trihydrates available from the Bayer Process and containing a relatively high concentration of free alkali metal (not a part of the crystallite structure of the support), principally $Na_2O$, can be utilized to produce an improved pellet type catalyst having the desired combination of pore structure, surface area and depth of catalyst penetration, as described in copending application U.S. Ser. No. 658,031. We have found that the improved catalyst may be made if the alkali metal containing support material is treated with a dilute acid or acid salt to neutralize, to the desired depth of the support, the alkali metal cations which are not tied-up in the alumina crystallites of the support prior to impregnation with the catalyst material.

In carrying out the method of our invention, alumina trihydrate, e.g., bayerite, gibbsite, containing from about 0.15 to about 0.6 wt. % $Na_2O$ is ground to a preferred average size of about 10 microns with particles in a range of about 1-20 microns constituting about 90% by weight of the material. We have found that such size distribution produces new seed in the disc balling process at a rate such as to maintain a steady-state forming operation with resultant greater reproducibility and uniformity of product. Also, a narrow range of particle size produces a product with greater porosity, this resulting in lower bulk density with better diffusivity, improved warm-up and conversion performance. The size-density relationship is shown in Table I.

TABLE I

PELLET DENSITY-ALUMINA PARTICLE SIZE RELATIONSHIP (WITHOUT MICROBALLOONS)

| Average Particle Size (μ) | Particle Size Range (μ) | Formed Beads Density |
|---|---|---|
| ~ 35 | 90% by weight 1 - 50 | 0.753 – 0.785 g/cc 47 – 49 lbs./ft.³ |
| ~ 25 | 90% by weight 1 - 35 | 0.705 – 0.737 g/cc 44 – 46 lbs./ft.³ |
| ~ 10 | 90% by weight 1 - 20 | 0.657 – 0.689 g/cc 41 – 43 lbs./ft.³ |

The ground alumina is then flash calcined to obtain an amorphous or transition material. The hot air flow rate through the calciner is maintained at a rate that will achieve good material flow and an alumina residence time in the calciner sufficient to yield the desired product which is collected by any suitable means such as cyclone or bag devices. It should be recognized that the flash calcining details need to be adjusted to the design and size of the calciner to yield a satisfactory product.

In this regard, it is necessary that the ground alumina trihydrate be exposed to a temperature in excess of 1000° F. for a short period of time to form a product that is shown by X-ray diffraction analysis to be predominately of amorphous structure. The resulting product may contain race amounts of boehmite, chi, gamma, alpha and other crystalline alumina structures. Weight loss and BET specific surface area measurements may also be used in determining the suitability of the amorphous product. More particularly, the flash calcined product when heated at 1000° F. for 1 hour, should have a weight loss of from about 3-7% and a specific surface area of from about 220 to 300 m²/g. Based on our tests, consistently acceptable flash calcined alumina may be obtained with the use of calciner inlet air temperature of from about 1350° – 1450° F., exit air temperatures of from about 790° – 840° F. and calcined product temperatures of from about 450° – 500° F., air flow rate through the calciner being such as to produce a powder residence time in the calciner of from about 1 – 3 seconds.

The flash calcined alumina is then formed into a pellet of the desired size and shape by any suitable means such as by disc balling, extrusion or molding. We prefer disc balling using essentially standard techniques and equipment. In practicing our process, the alumina is fed dry onto the rotating disc which is also fed with a water spray. The combustible organic particles formed from non-acid hydrophobic type thermoplastic materials such as saran micro-balloons may be mixed either with the alumina or in the water as a suspension, such materials enabling control of the pore structure of the support. The use of saran microballoons is preferred and an average size of the hollow microballoons of from about 20-30 microns has been found to produce the desired pore structure. The quantity of microballoons is selected so as to comprise about 0.12 to about 0.5 weight percent of the balled product.

The preferred use of hollow saran microballoons results from their extremely light weight, their size range on average being of from about 20–30 microns, compatibility with the rehydration process, and their burn-out properties. Hollow phenolic microballoons were investigated but were found to interfere with the rehydration of the amorphous alumina. The density of the final catalyst pellet may be varied by varying the concentration of the microballoons in the balled support. As shown in Table II, sample D represents an improved catalyst made by the method of our invention, the support having an especially high pellet density in that it was made using only 0.125 wt. % microballoons. As indicated above, the density of the pellet is also affected by the average particle size and particle size range of the alumina trihydrate material used in the process. This relationshi is shown in Table I.

We have found it to be necessary, when using alumina as a support material, to maintain total water content in the balled product at about its maximum moisture holding capacity to assure sufficient particle-to-particle contact enable rehydration bonding by the formation of alpha alumina monohydrate boehmite. Such complete rehydration bonding is necessary to assure thermal aging strength in the resultant catalyst.

Particle-to-particle contact is accomplished by the combined effect of ball-to-ball impacts on the rotating disc and of capillary action in the ball pellet, this latter effect being optimum when the moisture content is maintained at about the maximum. Where the amorphous alumina has a wide particle size range such as about 90% by weight of the alumina being in the 1 – 50 micron size range with an averge particle size of about 35 microns, the water required is about 33% of the weight of the pellets. Where the amorphous alumina has a narrow pellet size range such as where 90% by weight of the alumina is in the range of about 1 – 20 microns with an average particle size of about 10 microns, the water required is about 40% of the pellet weight. The higher water requirement results from the greater moisture holding capacity of the pellet having the narrow range particle size and smaller average size material. We have also found that the addition of ammonia to the water in the amount of about 1% by weight of the water serves to accelerate the rehydration process. While we have described our invention in terms of using a water suspension of the microballoons, it is obvious that the water may be added separately from the balloons.

In handling the saran microballoon suspension, it has been found necessary to maintain continuous mixing since the suspension is thixotropic. It is also necessary to maintain a reasonably homogeneous mixture of the microballoons and the amorphous alumina in order to maintain consistently acceptable mechanical strength in the pellet as finally produced. Also, we have found that a concentration of microballoons greater than about 0.5% by weight of the pellet will reduce the strength and pellet density to unacceptable levels. For example, a 1% microballoon concentration was found to reduce the crush number values from about 12 - 14 pounds to a value of about 5 - 6 pounds. Similar results were observed with respect to the pellet density. It is therefore apparent that the control of microballoon concentration and water content is especially important in our process where alumina is the support material.

The balled amorphous alumina resulting from the foregoing processing is placed in a suitale generally moisture-tight cntainer and is maintained in an oven environment at about 150° F. to about 175° F. to initiate rehydration of the alumina to the monohydrate form, boehmite. Since the reaction is exothermic, the temperature will rise and the material will take a hard set at which point it is immersed in 180° F. to about 200° F. water for a period of from 5 - 10 minutes. On draining the excess water the material is again sealed in a container where it is maintained for about 72 hours at a temperature of about 170° F. to about 190° F.

Upon drying, the rehydrated alumina is calcined to achieve the desired surface area of at least 100 m²/g. By using the following heating batch schedule, a surface area of about 120 m²/g. was obtained:

ambient to 800° F. — over a period of about ½ hr.
800° F. to 1200° F. — over a period of ½ to 1 hr.
1200° F. to 1700° F. — over a period of about ½ to 1 hr.
1700° F. — hold for ½ to 1 hr.

A higher temperature and shorter calcining temperature can also be used. The microballoons, being of extremely low mass, burnout without difficulty to produce the desired pore structure in the calcined pellet. We have found that a firing schedule to a peak temperature of about 1860° F. may be used with a holding period of about 5 minutes with substantially the same results.

We have found from our experimental work that calcining alumina supports containing alkali metal concentrations of from about 0.15 to 0.6% by weight of the support results in surface areas which vary in proportion to the amount of alkali metal when using identical heat schedules, as shown below.

| Support % Na₂O | Peak Calcining Temp.- (° F.) and Hold Time | BET Surface Area - (m²/g) |
| --- | --- | --- |
| 0.2% | 1700, 1 hr.; 1860, 5 min. | 118 – 124 |
| 0.4% | 1700, 1 hr.; 1860, 5 min. | 130 – 135 |
| 0.5% | 1700, 1 hr.; 1860, 5 min. | 140 |

The calcined pellets, i.e., gamma alumina, are then treated with very diluted acid to neutralize the free alkali metal, principally Na₂O, to enable impregnation with catalytic material to a controlled depth of from at least 90 to about 250 microns. This treatment does not remove any of the constituents forming the support crystallites. A typical and preferred neutralization treatment comprises continuously stirring 0.05% by weight hydrochloric acid at room temperature with the calcined support material. The stirring is maintained for a period of about 2 - 3 minutes, the volume of acid being at least about five times the volume of the support material to avoid any substantial change in acid concentration. The alumina pellets are neutralized to a depth of about 120 microns by the above treatment whereupon the hydrochloric acid solution is decanted or otherwise removed. The treated pellets are dried at about 400° F. and are ready for catalyst impregnation upon being blown free of any dust which may have accumulated in the handling of the material.

It is believed that in the course of the acid neutralization using such acids as HCl, HNO₃, H₂SO₄ or their soluble salts such as AlCl₃, Al(NO₃)₃, Al(SO₄)₃, the free alkali cations, principally sodium, form the neutral salts, e.g., NaCl, within the support, which salts do not interfere with the solubility of the catalytic metal salts, or acids e.g., palladium chloride and chloroplatinic acid. The catalyst thus impregnates the support to the depth to which the acid treatment penetrated. In the absence of such neutralization treatment, it is our belief that the catalyst, i.e., palladium chloride, precipitates in the support as some form of hydrated palladium oxide in accordance with the following reactions when the support is being impregnated with the noble metal solution:

$$PdCl_2 + 2 NaOH \rightarrow PdO \cdot H_2O + 2 NaCl$$

$$PdO \cdot H_2O + XH_2O \rightarrow PdO \cdot XH_2O$$

The precipitate is believed to be of such molecular size as to plug the pores of the alumina support thus preventing the desired and reproducible impregnation. The plugging action described is indicated by the fact that the unneutralized support has a low moisture retention capacity when treated with the palladium containing catalyst solution whereas after neutralization in the manner described the moisture retention capacity is increased by about 50%. Also the neutralization treated support shows substantially greater conversion efficiency and longer life than the untreated support thus showing greatly improved catalyst distribution. Further, it has been found that treatment of the support with an acid solution also containing the catalyst solution fails to produce our described neutralization and catalyst penetration control.

On the basis of our experimental work, we have been able to effectively use alumina pellets containing from about 0.15 to about 0.60% Na₂O. We have been able to obtain noble metal penetration of at least 90 microns by treating the support with a dilute acid of about 0.04 to about 0.15% concentration for a period of about one minute prior to catalyst impregnation. As noted above, a solution of a salt of the acid may be used in lieu of the acid, the solution having an equivalent concentration of acid anion. Treatment times in excess of about 5 minutes have been found to have progressively less effect and it is preferred that the acid concentration instead be increased for deeper neutralization treatment. While we have described our neutralization treatment as following the calcining step, it should be understood that such neutralization is possible prior to calcining.

Impregnation of the dilute acid treated support with the catalytically active metallic material, e.g., a Pt/Pd salt solution, is then effected by any of the techniques well known in the art. By way of example, we prefer to tumble the support material while spraying the catalyst solution onto the pellets. The catalyst spraying solution is prepared from a 10% Pt stock solution of chloroplatinic acid and a 5% Pd stock PdCl solution. The solution volume used is sufficient to produce a catalyst having a 5:2 ratio of Pt:Pd with a total metal content in a 260 cu. in. converter of 0.05 troy oz.

In accordance with our invention, we have prepared samples of catalyst which show significantly improved conversion results when compared with typical commercially available catalysts while at the same time being able to use less costly support material in that the alkali metal content of the alumina does not have to be removed. Also, the catalyst made in accordance with our invention has physical strength and thermal stability characteristics well within specification limits. Table II shows the comparison between the catalysts of our invention, samples B, C, D, and E with those of typical commercial catalysts A and F.

In comparison, catalyst sample B made in accordance with our invention and having the catalyst characteristics shown in Table II performs at about a 57% conversion after 35 hours, sample C showing a conversion of about 68% after the same period of time. As disclosed in the copending application, 35 hours of accelerated durability testing is the equivalent of 50,000 miles real-time testing. The results of real-time testing for catalyst samples A, D, E, and F are also shown in the identified copending patent application and demonstrate the improved performance of the samples D and E made in accordance with our invention.

From the foregoing description it can be seen that applicants have provided a method for producing an improved pellet catalyst which enables control of the pore structure, surface area, and depth of penetration by the catalytic material, so as to produce a catalyst having the desired level of conversion for the required lifetime of the catalyst. Also, the use of alumina having relatively high levels of alkali metal is contemplated in our method with resultant substantial savings in the cost of materials. While we have described our invention in terms of alumina support materials, the use of other well

TABLE II

| Catalyst | Commercial A | B | C | D | E | Commercial F |
|---|---|---|---|---|---|---|
| surface area (m²/g) | 94 | 131 | 130 | 125 | 118 | 125 |
| pellet density (g/cm³) | 1.132 | 1.052 | 1.052 | 1.159 | 0.970 | 1.103 |
| macroradius* (A°) | 6,270 | 10,872 | 10,872 | ~187,000 | 20,325 (monomodal) | 104 |
| microradius* (A°) | 90 | 73 | 73 | 94 | 95 | |
| macrovolume (cm³/g) | 0.140 | 0.170 | 0.170 | 0.025 | 0.179 | |
| microvolume (cm³/g) | 0.461 | 0.497 | 0.497 | 0.0579 | 0.569 | |
| solid density (g/cm³) | 3.54 | 3.53 | 3.53 | 3.38 | 3.53 | 3.43 |
| impregnated depth (microns) | 39 | 103 | 132 | 227 | 152 | 36 |
| Pt - wt. % | 0.035 | 0.043 | 0.060 | 0.033 | 0.046 | 0.037 |
| Pd - wt. % | 0.014 | 0.019 | — | 0.014 | 0.0200 | 0.015 |
| pellet shape | spherical | spherical | spherical | spherical | spherical | cylindrical (monomodal) |
| pore volume (cm³/g) (total porosity) | 0.601 | 0.667 | 0.667 | 0.604 | 0.748 | 0.615 |
| acid soak time (min.) | | 1 | 1 | 10 | 2 | |
| acid concentration (wt. %) | | 0.05 | 0.05 | 0.12 | 0.05 | |
| microballoons (wt. %) | | 0.5 | 0.5 | 0.125 | 0.5 | |
| crush number (fresh - lbs.) | 16.4 | 14 | 14 | 16 | 11.5 | |
| attrition (fresh - %) | 0.26 | 4.2 | 4.2 | 1.2 | 4.8 | |
| shrinkage (%) | 2.0 | 2.4 | 2.4 | 2.4 | 3.2 | |
| Na₂O (wt. %) | | 0.45 | 0.45 | 0.29 | 0.20 | |
| calcine ° F. - hold period | | 1700-1 hr. | 1700-1 hr. | 1700-2 hrs. | 1700-1 hr. | |

*integral averaged value

In determining the crush numbers a representative sample of the catalyst was taken, each of 10 pellets being subjected to a crushing force in pounds between two flat plates, the load at failure being the number for each pellet and the crush number shown being the average for the 10 pellets. The percentage attrition represents the weight loss measured for a given weight of sample when blown for a period of 5 minutes by a stream of nitrogen gas fed into the pellet container at a rate of 3.09 scfm. Similarly, the percentage shrinkage represents the loss in volume of a 250 cc vibration-packed sample of pellets after heating the sample to 1800° F. where it is held for a period of 24 hours.

As is shown in the conversion curves forming a part of assignee's copending appliction U.S. Ser. No. 658,031, filed Feb. 13, 1976, catalysts made in accordance with our invention have significantly improved performance. By way of summary, a comparison of samples A, B, and C shown in Table II in a hydrocarbon conversion accelerated durability test shows that the commercial sample A falls off rapidly in conversion efficiency after about 31 hours, the catalyst poisons having advanced past the depth of penetration of the catalytically active material shown as being 39 microns.

known refractory ceramic materials having such alkali metal content as described herein is within the skill of the art and within the teachings of our invention as covered by the claims which follow.

We claim:

1. In a method for making pellet-type catalysts the improvement comprising the steps of grinding to the desired size refractory ceramic support materials having a high free alkali metal content of at least about 0.15% based on the weight of said support material, forming the resulting support materials into pellets of the desired shape and size, calcining the pellets to obtain the desired surface area and pore structure, soaking the pellets in a dilute inorganic acid solution having a concentration of from about 0.04 to about 0.15 weight % acid or in a solution of the salt of the acid having an equivalent concentration of acid anion, said soaking being continued for a short period of time of at least about one minute such as to avoid removal of any constitutents forming the support crystallites and to enable penetration of the acid anions into said pellets to the depth to which it is desired to impregnate the pellets with catalytically active metallic material, draining said solution from said pellets, and impregnating said pellets with a solution of a salt or acid of the catalytically active material to the depth of acid or acid salt treatment, said catalytically active material being at least one of the metals selected from the Groups V-B, VI-B and VIII of the Periodic Table of Elements, and copper, the use of said high alkali metal content refractory ceramic support material resulting in substantial cost savings in support material and enabling control of the depth of catalyst impregnation and pellet surface area.

2. In a method for making pellet-type catalysts the improvement comprising the steps of grinding to the desired size a refractory ceramic support material having a high free alkali metal content of at least about 0.15% based on the weight of said support material, mixing said support material with a combustible organic material formed from a non-acid hydrophobic type thermoplastic material having an average particle size of from about 20 to 30 microns, forming the resulting support and organic materials mixture into pellets of the desired shape and size wherein said organic material is present in an amount of from about 0.12 to 0.5 weight % of said pellet, calcining the pellets to burn-out said organic material and obtain the desired surface area and pore structure, soaking the pellets in a dilute inorganic acid solution having a concentration of from about 0.04 to about 0.15 weight % acid or in a solution of the salt of the acid having an equivalent concentration of acid anion, said soaking being continued for a short period of time of at least about 1 minute such as to avoid removal of any constituents forming the support crystallites and to enable penetration of the acid anions into said pellets to the depth to which it is desired to impregnate the pellets with catalytically active metallic material, draining said solution from said pellets, and impregnating said pellets with a solution of a salt or acid of the catalytically active material to the depth of acid or acid salt treatment, said catalytically active material being at least one of the metals selected from the Groups V-B, VI-B and VIII of the Periodic Table of Elements, and copper, the use of said high alkali metal content refractory ceramic support material resulting in substantial cost savings in support material and enabling control of the depth of catalyst impregnation and pellet surface area.

3. The method in accordance with claim 2 wherein said acid or acid salt treatment uses one of the acids selected from the group consisting of hydrochloric, nitric and sulfuric acid.

4. The method in accordance with claim 3 wherein said combustible organic material consists of saran microballoons and said acid is hydrochloric.

5. In a method for making pellet-type catalysts the improvement comprising the steps of grinding to the desired size alumina trihydrate containing a high concentration of free alkali metal of at least about 0.15% based on the weight of said alumina trihydrate, flash calcining said alumina trihydrate to convert it to the amorphous structure, mixing said amorphous alumina with water and a combustible organic material formed from a non-acid hydrophobic type thermoplastic material having an average particle size of from about 20 to 30 microns, sufficient water being mixed with said amorphous alumina and organic material to substantially satisfy the maximum moisture holding capacity of the mixture, forming said mixture into pellets of the desired shape and size, said combustible organic material being present in the pellet in an amount of from about 0.12 to 0.5 weight percent, rehydrating said pellets to the monohydrate form, calcining said pellets to burn-out said organic material and obtain the desired pore structure and surface area, treating said pellets with a dilute inorganic acid water solution having a concentration of from about 0.04 to 0.15 weight percent acid or with a solution of the salt of the acid having an equivalent concentration of acid anion, said acid treatment being continued for a short period of time of at least about 1 minute such as to avoid removal of any constituents forming the support crystallites and to enable penetration of the acid anions into said pellets to the depth to which it is desired to impregnate the pellets with catalytically active metallic material, draining said solution from said pellets, and impregnating said pellets with a solution of a salt or acid of the catalytically active material to said desired depth, said catalytically active material being at least one of the metals selected from the Groups V-B, VI-B and VIII of the Periodic Table of Elements, and copper, the use of said high alkali metal containing alumina trihydrate enabling substantial cost savings and the control of the depth of catalyst penetration and pellet surface area.

6. The method in accordance with claim 5 wherein said acid or acid salt treatment uses one of the acids selected from the group consisting of hydrochloric, nitric and sulfuric acid, said treatment being applied after said calcining to burn-out said organic material.

7. The method in accordance with claim 6 wherein said acid or acid salt concentration is at least about 0.04% by weight.

8. The method in accordance with claim 7 wherein said combustible organic material is saran microballoons and the quantity of acid or acid salt used in treating said calcined pellets is at least about five times the volume of said pellets to preclude any substantial change in acid concentration.

9. The method in accordance with claim 8 wherein the amount of water added to said amorphous alummina is at least 33% of the weight of the formed pellets prior to rehydration, the amount of water required to satisfy the maximum water retention ability of the pellets increasing as the size range of the amorphous alumina narrows and its average size decreases.

10. The method in accordance with claim 8 wherein said alumina trihydrate is ground to an average particle size of about 10 microns with a range of about 1–20 microns for the particles constituting about 90% by weight of the material, said alkali metal being principally sodium oxide, said microballoons being added as a water suspension in which the amount of water is about 40% of the weight of the formed pellets, said acid treatment being accomplished using 0.05% hydrochloric acid, said rehydrated pellets having been calcined using a peak temperature of at least 1700° F. which is held for a period of at least about ½ hour.

* * * * *

UNITED STATES PATENT AND TRADEMARK OFFICE
CERTIFICATE OF CORRECTION

PATENT NO. : 4,051,072
DATED : September 27, 1977
INVENTOR(S) : Raymond E. Bedford and Morris Berg It is certified that error appears in the above-identified patent and that said Letters Patent are hereby corrected as shown below:

Column 1, line 7, "638,031" should read -- 658,031 --.

Column 4, line 41, "relationshi" should read -- relationship --.

Column 5, line 24, "suitale" should read -- suitable --;

line 25, "cntainer" should read

Signed and Sealed this

Eleventh Day of April 1978

[SEAL]

Attest:

RUTH C. MASON
Attesting Officer

LUTRELLE F. PARKER
Acting Commissioner of Patents and Trademarks